(12) United States Patent
Saito et al.

(10) Patent No.: US 11,650,823 B2
(45) Date of Patent: May 16, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Masato Saito, Kanagawa (JP); Masayoshi Miki, Kanagawa (JP); Teiju Sato, Kanagawa (JP); Yasuhiro Nakatani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 338 days.

(21) Appl. No.: 16/795,606

(22) Filed: Feb. 20, 2020

(65) Prior Publication Data
US 2021/0096875 A1  Apr. 1, 2021

(30) Foreign Application Priority Data
Sep. 27, 2019  (JP) .............................. JP2019-177685

(51) Int. Cl.
*G06F 11/00* (2006.01)
*G06F 9/38* (2018.01)
*G06F 11/07* (2006.01)
*G06F 9/50* (2006.01)

(52) U.S. Cl.
CPC ............ *G06F 9/3861* (2013.01); *G06F 9/505* (2013.01); *G06F 11/0721* (2013.01); *G06F 11/0757* (2013.01)

(58) Field of Classification Search
CPC ............. G06F 11/0721; G06F 11/0757; G06F 11/0703; G06F 11/0754; G06F 11/0751; G06F 11/34; G06F 11/3409; G06F 11/3414; G06F 11/3423
See application file for complete search history.

(56) References Cited

U.S. PATENT DOCUMENTS 8,489,923 B1 * 7/2013 Lakshminarayanan ...................... H04L 12/2812
714/26
2019/0102276 A1 * 4/2019 Dang .................. H04L 67/1097
2019/0312947 A1 * 10/2019 Brown ................ G06F 11/0709

FOREIGN PATENT DOCUMENTS

| JP | 2002140209 | 5/2002 |
|----|------------|--------|
| JP | 2005122424 | 5/2005 |
| JP | 2008262443 | 10/2008 |
| JP | 2009020545 | 1/2009 |

* cited by examiner

*Primary Examiner* — Katherine Lin
(74) *Attorney, Agent, or Firm* — JCIPRNET

(57) ABSTRACT

An information processing apparatus includes a processor configured to execute a reset process for resetting a watchdog timer, execute a recovery process of the information processing apparatus, in a case where the watchdog timer is not able to be reset within a time limit, and sets the time limit to a longer time, in a case where an apparatus load which is at least one of a current processing load per unit time of the information processing apparatus or a processing amount of a processing request which is input to the information processing apparatus is large, as compared to a case where the apparatus load is small.

6 Claims, 3 Drawing Sheets

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-177685 filed Sep. 27, 2019.

BACKGROUND

(i) Technical Field

The present invention relates to an information processing apparatus and a non-transitory computer readable medium storing an information processing program.

(ii) Related Art

In the related art, a watchdog timer which detects that an information processing apparatus has fallen into an abnormal state such as a hang. The watchdog timer counts up a timer value. In the information processing apparatus being in a normal state, the timer value is reset before the timer value reaches a predetermined limit value, that is, within a predetermined time limit. In a case where the information processing apparatus cannot reset the timer value and the timer value reaches the limit value (that is, in a case where the time limit has elapsed since the timer value is reset last time), it is determined that the information processing apparatus has fallen into an abnormal state.

In the related art, a technique for dynamically changing the time limit of a watchdog timer has been proposed.

For example, JP2002-140209A discloses a watchdog timer that monitors a time interval until a timer value is cleared and sets a maximum time interval monitored as a time limit. JP2005-122424A discloses a watchdog timer that sets a time limit at the time of starting the system longer than a time limit after the system is started. JP2008-262443A discloses a watchdog timer having an integrating circuit composed of a resistor and a capacitor, in which a time limit is set to be long by a resistor of the integrating circuit during a starting period of a motor drive system, and thereafter, shortens the time limit by reducing the resistance value of the resistor. JP2009-020545A discloses a watchdog timer in which a different time limit is set for each application running on an information processing apparatus.

SUMMARY

However, in order to shorten the time required to execute the recovery process of the information processing apparatus in a case where the information processing apparatus has fallen into an abnormal state such as a hang, it is conceivable to shorten the time limit of the watchdog timer. However, in a case where the time limit is short and the load on the information processing apparatus causes a delay in the reset processing of the watchdog timer, the recovery process may be erroneously executed even though the information processing apparatus has not fallen into an abnormal state in fact.

Aspects of non-limiting embodiments of the present disclosure relate to an information processing apparatus and a non-transitory computer readable medium storing an information processing program, which are capable of suppressing an increase in time until the recovery process is executed, in a case where a delay in the reset process of a watchdog timer caused by the load on the information processing apparatus cannot occur, and suppressing the erroneous execution of the recovery process in a case where the delay can occur, as compared with a case where a time limit of a watchdog timer is not changed according to a load on an information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to execute a reset process for resetting a watchdog timer, execute a recovery process of the information processing apparatus, in a case where the watchdog timer is not able to be reset within a time limit, and sets the time limit to a longer time, in a case where an apparatus load which is at least one of a current processing load per unit time of the information processing apparatus or a processing amount of a processing request which is input to the information processing apparatus is large, as compared to a case where the apparatus load is small.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
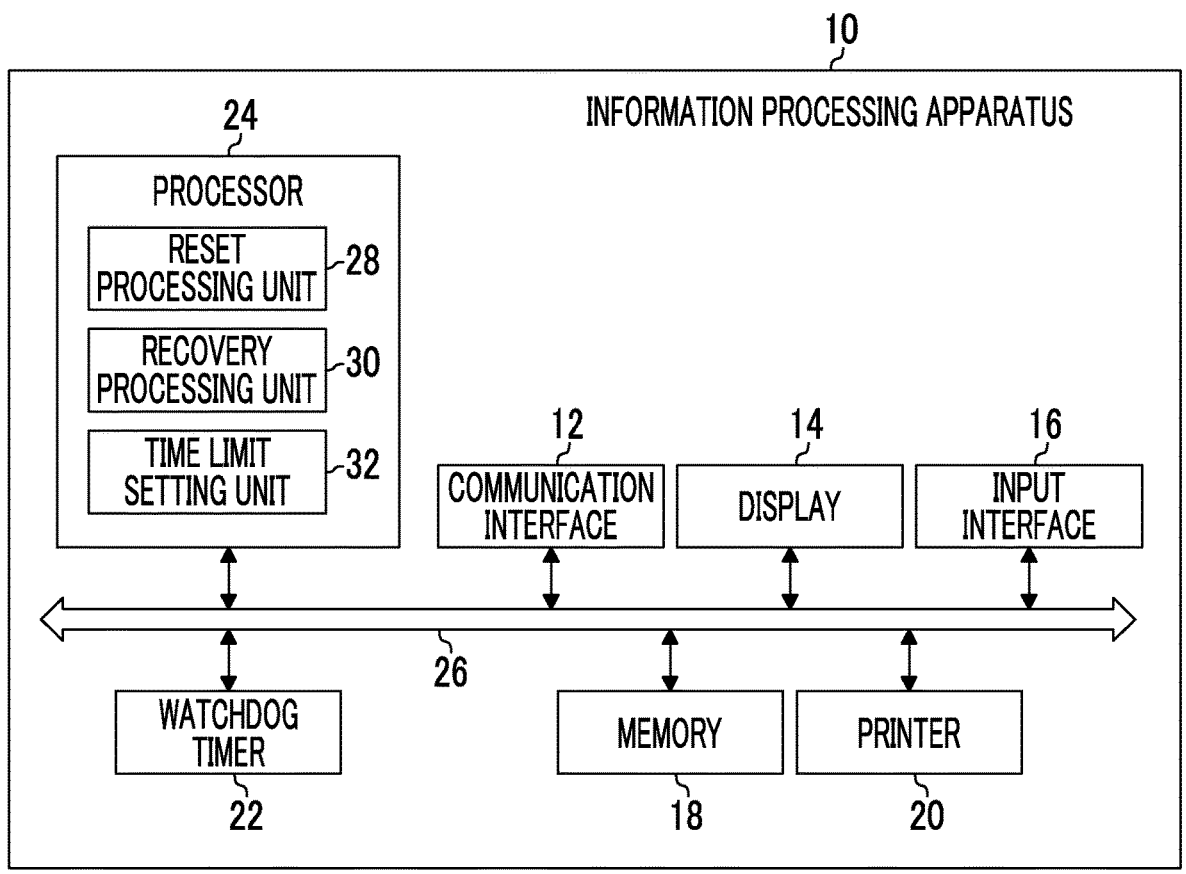
FIG. 1 is a schematic configuration diagram of an information processing apparatus according to the present exemplary embodiment.

FIG. 1 is a schematic configuration diagram of an information processing apparatus 10 according to the present exemplary embodiment. Although the information processing apparatus 10 according to the present exemplary embodiment is a printing machine or a multifunction peripheral having a printing function, the information processing apparatus 10 may be, for example, a personal computer, a server computer, or a tablet terminal.

A communication interface 12 includes, for example, a wired or wireless LAN adapter. The communication interface 12 has a function of communicating with another apparatus via a communication line such as a LAN or the Internet. For example, the communication interface 12 can be used to receive, from a user terminal used by the user, a job as a processing request for causing the information processing apparatus 10 to execute processing (for example, printing process).

A display 14 includes a liquid crystal display, for example. Various screens are displayed on the display 14.

For example, the display 14 displays information about a job being executed by the information processing apparatus 10.

An input interface 16 includes, for example, a touch panel and various buttons. In a case where the information processing apparatus 10 is a personal computer or the like, the input interface 16 may include a mouse or a keyboard. The input interface 16 is used to input a user's instruction to the information processing apparatus 10.

The memory 18 includes, for example, a hard disk, a solid state drive (SSD), an embedded multi media card (eMMC), a ROM, a RAM, and the like. The memory 18 may be provided separately from a processor 24 described later, or at least a part thereof may be provided inside the processor 24. The memory 18 stores an information processing program for operating each unit of the information processing apparatus 10.

The printer 20 includes, for example, a paper feed mechanism, a photosensitive drum, or a cartridge. The printer 20 prints image data on a recording medium, based on a print job or a copy job input by the user. Although only the printer 20 is shown in FIG. 1, in a case where the information processing apparatus 10 is a multifunction peripheral, the information processing apparatus 10 includes, for example, a platen, a light source, and an image sensor, and may be provided with a scanner which optically reads a paper document and generates image data corresponding to the paper document.

A watchdog timer 22 includes a counter that counts up a timer value. The timer value may be, for example, a value obtained by counting the number of clocks. The watchdog timer 22 detects that the information processing apparatus 10 has fallen into an abnormal state such as a hang. The watchdog timer 22 always counts up the timer value while the information processing apparatus 10 is started. In a normal state where the information processing apparatus 10 is operating normally, a reset signal is basically transmitted from the processor 24 to the watchdog timer 22 before the timer value reaches a predetermined limit value. Upon receiving the reset signal, the watchdog timer 22 resets the timer value (for example, returns to 0). In a state where the information processing apparatus 10 has fallen into an abnormal state, in a case where the watchdog timer 22 does not receive a reset signal from the processor 24 and the timer value reaches the limit value, the watchdog timer 22 transmits a recovery processing request signal to the processor 24.

Since the time required to count up the timer value once is constant and known, the time from when the timer value is reset last time until the timer value reaches the limit value can be determined based on the limit value. In the present specification, the time when the limit value is reached since the timer value is reset last time is referred to as a time limit.

The processor 24 refers to a broadly-defined processing device, and includes at least one of a general-purpose processing device (for example, a central processing unit (CPU)) and a dedicated processing device (for example, a graphics processing unit (GPU), an application specific integrated circuit (ASIC), a field programmable gate array (FPGA), or a programmable logic device). The processor 24 may not be a single processing device but may be constituted by cooperation of a plurality of processing devices existing at physically separated positions.

The above-described components of the communication interface 12, the display 14, the input interface 16, the memory 18, the printer 20, and the watchdog timer 22 are connected to the processor 24 by a data bus 26. The processor 24 controls each component by transmitting and receiving data to and from each component via the data bus 26.

Further, as shown in FIG. 1, the processor 24 performs the functions of a reset processing unit 28, a recovery processing unit 30, and a time limit setting unit 32.

The reset processing unit 28 transmits, to the watchdog timer 22, a reset signal for resetting the timer value of the watchdog timer 22. The transmission of the reset signal from the reset processing unit 28 to the watchdog timer 22 is called reset processing. As long as the processor 24 is operating normally, the reset processing unit 28 attempts to execute the reset process within the time limit of the watchdog timer 22 since the last time the reset signal is transmitted. However, even in a case where the processor 24 is operating normally, due to an increase in the processing load of the processor 24, the timing of the reset processing may be delayed due to the delay of the processing of the reset processing unit 28. The time limit of the watchdog timer 22 is, for example, an initial time limit (for example, 3 seconds) set by a designer of the information processing apparatus 10 immediately after the information processing apparatus 10 is started, but can be dynamically changed by a time limit setting unit 32 to be described later.

Upon receiving the recovery processing request signal from the watchdog timer 22, the recovery processing unit 30 executes the recovery process of the information processing apparatus 10. As described above, it can be said that the watchdog timer 22 transmits the recovery processing request signal to the processor 24 in a case where the reset signal is not received from the reset processing unit 28 within the time limit of the watchdog timer 22, and the recovery processing unit 30 executes the recovery process of the information processing apparatus 10 in a case where the watchdog timer 22 is not reset within the time limit since the timer value is reset last time. The recovery process is a process of bringing the information processing apparatus 10 into a normal state, for example, a process of restarting the information processing apparatus 10 including the processor 24.

The time limit setting unit 32 sets a time limit for the watchdog timer 22. Specifically, the time limit setting unit 32 sets the time limit according to the apparatus load that is the load on the information processing apparatus 10. Specifically, a first load threshold which is a threshold related to the apparatus load is set in advance, and in a case where the acquired apparatus load exceeds the first load threshold, the time limit setting unit 32 sets the time limit of the watchdog timer 22 to an extension time (for example, 60 seconds) that is longer than the initial setting time.

In a case where the apparatus load is large, the operation of the reset processing unit 28 is delayed even though the information processing apparatus 10 is in a normal state, and the reset processing unit 28 may not executes the reset process of the watchdog timer 22 within the time limit before the change. Therefore, by increasing the time limit in a case where the apparatus load is large, even in a case where the operation of the reset processing unit 28 is delayed and the execution of the reset process is delayed, it is possible to suppress the erroneous execution of the recovery process (that is, in fact, the information processing apparatus 10 is in a normal state).

Although the exemplary embodiment can be adopted where after the information processing apparatus 10 is started, the time limit setting unit 32 determines whether or not the apparatus load exceeds the first load threshold only once at a predetermined timing and sets the time limit of the watchdog timer 22, in the present exemplary embodiment, the time limit setting unit 32 intermittently acquires the apparatus load of the information processing apparatus 10 and intermittently sets the time limit based on the acquired apparatus load. Thus, the time limit of the watchdog timer 22 can be dynamically changed. In the present exemplary embodiment, the time limit setting unit 32 acquires the apparatus load of the information processing apparatus 10 and sets the time limit, periodically, in other words, every predetermined time (for example, every 1.5 seconds).

The apparatus load is a processing load per unit time of each component of the information processing apparatus 10 at the present time (that is, when the apparatus load is acquired by the time limit setting unit 32). Each component here may include not only the processor 24 that executes the reset process but also other components. For example, the communication interface 12 and the memory 18 (RAM or hard disk) may be included. This is because, as described above, although the processor 24 and each component are connected by the data bus 26, in a case where the processing load of components other than the processor 24 increases, the load on the data bus 26 (in other words, the data amount of the data passing through the data bus 26) increases, and as a result, the processing of the processor 24 itself may be delayed.

The apparatus load may include a processing load of a job processing unit that processes a job input to the information processing apparatus 10, such as the printer 20 or a scanner (not shown). The processor that controls the job processing unit may be provided separately from the processor 24 that controls the entire information processing apparatus 10. For example, in a low-end model printing machine, the processor 24 that controls the entire information processing apparatus 10 may control the job processing unit. For example, in a case where the processor 24 controls a mechanism part of the printer 20, in a state where the processing load of the printer 20 is large, the processing load of the processor 24 may be large. In particular, since the control of the mechanical part of the printer 20 is directly related to the quality of the printed matter, the control process of the printer 20 is preferentially executed in the processor 24 in many cases, and in a case where the processing load of the printer 20 increases, the reset process by the reset processing unit 28 may be delayed. Therefore, the processing load of the printer 20 may be included as the apparatus load.

The processing load of each component, including the processor 24, is the processing load of each component per unit time. The processing load of the processor 24 per unit time can be acquired based on, for example, a CPU usage rate indicating a ratio of the processing time (non-idle time) of the processor 24 within the unit time. The processing load of the communication interface 12 per unit time can be acquired based on the amount of communication per unit time. The processing load of the memory 18 per unit time can be acquired based on the amount of data per unit time input and output to and from the memory 18. The processing load per unit time of the printer 20 can be acquired based on print data related to a print job, the print data being processed by the printer 20.

Here, it is assumed that the unit time is at least a time shorter than the initial setting time of the watchdog timer 22 and is a time close to the initial setting time, for example, the identical order to the initial setting time. For example, in the present exemplary embodiment, the unit time is set to 1 second because the initial setting time is 3 seconds. In a state where the unit time (for example, 10 seconds) is longer than the initial setting time, in a case where the time limit of the watchdog timer 22 is the initial setting time, the apparatus load is not so large in consideration of the span of the unit time (10 seconds), but in a case where the load is concentrated during 3 seconds of the unit time, the recovery process may be erroneously executed without extending the time limit. On the other hand, in a state where the unit time (for example, 10 ms) is considerably shorter than the initial setting time, the apparatus load is increased only for a certain unit time (10 ms), so the time limit may be extended even though it is not necessary.

As described above, since the apparatus load includes the processing load of each component per unit time, the first load threshold is set for each component. As the first load threshold for the processor 24, for example, the CPU usage rate is set to 80%, as the first load threshold value for the communication interface 12, for example, the communication amount is set to 800 Mbps, as the first load threshold for the RAM of the memory 18, for example, 8 GB/s is set, and as a first load threshold for the hard disk of the memory 18, for example, 0.8 MB/s is set.

Further, the apparatus load may be a processing amount of a processing request which is input to the information processing apparatus 10. This is because in the case where the processing amount requested by the processing request which is input to the information processing apparatus 10 is large, in a case where the process related to the processing request is executed, the processing load on the components of the information processing apparatus 10 is inevitably increased. The processing amount of the processing request which is input to the information processing apparatus 10 can be said to be the processing load of the components of the information processing apparatus 10 in the near future.

The processing amount of the processing request input to the information processing apparatus 10 is, for example, the processing amount required to complete the print job which is input to the information processing apparatus 10. The processing amount required to process a print job is estimated by analyzing the print job. For example, based on the document structure of the print data relating to the print job, the number of pages or the number of colors used, or the type of processing (image processing, OCR processing, object separation processing, or the like) requested by the print job, the processing amount of the print job is estimated. Further, the number of jobs input simultaneously may be used for estimating the processing amount.

In this case, the time limit setting unit 32 may calculate the processing amount of the print job by analyzing the print job, and then compare the calculated processing amount with the first load threshold, and in a case where a print job satisfies a predetermined condition (for example, the number of pages of the print data is equal to or larger than the threshold), it may be assumed that the processing amount required to complete the print job, that is, the apparatus load, has exceeded the first load threshold.

The time limit setting unit 32 can set at least one of the current processing load of each component included in the information processing apparatus 10 per unit time or the processing amount of the processing request which is input to the information processing apparatus 10 as the apparatus load. Specifically, any one or both of the current processing load of each component included in the information processing apparatus 10 per unit time and the processing amount of the processing request which is input to the information processing apparatus 10 may be used as the apparatus load.

Since the apparatus load of the information processing apparatus 10 may fluctuate over time, the apparatus load may temporarily become larger than the first load threshold, and then decrease. In the present exemplary embodiment, in a case where the time limit setting unit 32 intermittently acquires the apparatus load, the apparatus load temporarily becomes larger than the first load threshold, and after the time limit of the watchdog timer 22 is set to the extension time, in a case where the apparatus load is reduced, the time limit setting unit 32 shortens the time limit of the watchdog timer 22.

Specifically, the exemplary embodiment can be adopted where the time limit setting unit 32 shortens the time limit of the watchdog timer 22 in a case where the apparatus load of the information processing apparatus 10 is equal to or less than the first load threshold, but in the present exemplary embodiment, in a case where the apparatus load becomes less than the second load threshold smaller than the first load threshold, the time limit setting unit 32 shortens the time limit of the watchdog timer 22 and sets the time limit to a time shorter than the extension time. In other words, the time limit setting unit 32 does not shorten the time limit of the watchdog timer 22 at a timing when the apparatus load of the information processing apparatus 10 has decreased from a state greater than the first load threshold and has reached the first load threshold, and shortens the time limit of the watchdog timer 22 at a timing when the apparatus load further decreases and reaches the second load threshold.

As described above, since the apparatus load includes the processing load of each component per unit time, the second load threshold is set for each component similarly to the first load threshold. As the second load threshold for the processor 24, for example, the CPU usage rate is set to 40%, as the second load threshold value for the communication interface 12, for example, the communication amount is set to 400 Mbps, as the second load threshold for the RAM of the memory 18, for example, 4 GB/s is set, and as the second load threshold for the hard disk of the memory 18, for example, 0.4 MB/s is set.

As described above, since the time limit setting unit 32 sets the time limit of the watchdog timer 22 to the extension time in a case where the apparatus load of the information processing apparatus 10 exceeds the first load threshold, and shortens the time limit of the watchdog timer 22 in a case where the apparatus load is less than the second load threshold, it can be said that in a case where the apparatus load of the information processing apparatus 10 is large, the time limit setting unit 32 sets the time limit to be longer than in a case where the apparatus load is small.

In the present exemplary embodiment, the time limit setting unit 32 does not reduce the time limit of the watchdog timer 22 to less than the initial setting time. That is, in a case where the time limit is the initial setting time, the time limit setting unit 32 does not shorten the time limit any longer, regardless of the apparatus load of the information processing apparatus 10.

The apparatus load of the information processing apparatus 10 may be reduced after the apparatus load once increases (exceeds the first load threshold), and the apparatus load may increase again immediately after the apparatus load decreases. For example, there is a case where a plurality of jobs having a relatively large processing amount are processed by the information processing apparatus 10, and a case where the plurality of jobs are successively input to the information processing apparatus 10.

For example, when the first job is input to the information processing apparatus 10 or when the information processing apparatus 10 starts processing the first job, it is assumed that the apparatus load of the information processing apparatus 10 increases and exceeds the first load threshold. At this time, the time limit setting unit 32 sets the time limit of the watchdog timer 22 to the extension time, based on the apparatus load. Thereafter, it is assumed that the processing amount decreases as the first job approaches completion, and the apparatus load decreases to be equal to or less than the first load threshold. However, in a case where the second job is input to the information processing apparatus 10 immediately after, the apparatus load on the information processing apparatus 10 increases.

Here, when the processing amount of the first job is reduced and the apparatus load is equal to or less than the first load threshold, in a case where the time limit setting unit 32 shortens the time limit of the watchdog timer 22, when the second job is input immediately after and the apparatus load increases, depending on the timing when the time limit is shortened and the timing when the second job is input, the processing of the reset processing unit 28 is delayed, the reset process may not be able to be executed within the shortened time limit, and the recovery process may be erroneously executed. In order to reduce the possibility that the recovery process is erroneously executed in such a case, once the time limit of the watchdog timer 22 is set to the extension time, to make it difficult to shorten the time limit, in a case where the apparatus load is less than the second load threshold which is smaller than the first load threshold, the time limit setting unit 32 shortens the time limit of the watchdog timer 22.

In order to make it more difficult to shorten the time limit of the watchdog timer 22, a low load maintenance time, which is a predetermined time, is set in advance. In a case where the state where the apparatus load of the information processing apparatus 10 is less than the second load threshold is maintained during the low load maintenance time, the time limit setting unit 32 may shorten the time limit of the watchdog timer 22. In other words, the time limit setting unit 32 may not shorten the time limit of the watchdog timer 22 at a timing when the apparatus load of the information processing apparatus 10 has decreased from a state greater than the second load threshold and has reached the second load threshold, and may shorten the time limit of the watchdog timer 22 at a timing when the low load maintenance time has elapsed while the apparatus load is equal to or less than the second load threshold.

As another measure for reducing the possibility that the recovery process is erroneously executed in a case where the apparatus load of the information processing apparatus 10 becomes large again immediately after the apparatus load becomes small, after the time limit of the watchdog timer 22 is set to the extension time, in a case where the apparatus load of the information processing apparatus 10 becomes equal to or less than the first load threshold, the time limit setting unit 32 may shorten the time limit stepwise toward the initial setting time instead of immediately shortening the time limit of the watchdog timer 22 to the initial setting time. In other words, the time limit setting unit 32 may shorten the time limit of the watchdog timer 22 stepwise toward the initial setting time, in a case where the successively acquired apparatus loads at a plurality of time points are all equal to or less than the first load threshold.

By shortening the time limit in a stepwise manner, while the time limit is being shortened stepwise, the time limit is at least longer than the initial setting time, so that as compared with the case where the time limit is immediately shortened to the initial setting time, it is possible to reduce the possibility that the recovery process is erroneously executed when the apparatus load increases again while the time limit is shortened stepwise.

In a case where the apparatus load of the information processing apparatus 10 is less than the second load threshold, the time limit setting unit 32 may shorten the time limit stepwise toward the initial setting time instead of immediately shortening the time limit of the watchdog timer 22 to the initial setting time. In other words, the time limit setting unit 32 may shorten the time limit of the watchdog timer 22 stepwise toward the initial setting time, in a case where the successively acquired apparatus loads at a plurality of time points are all less than the second load threshold.

Similarly even in this case, compared to the case where the time limit is immediately shortened to the initial setting time, it is possible to reduce the possibility that the recovery process is erroneously executed when the apparatus load increases again while the time limit is being reduced in a stepwise manner.

Immediately after the information processing apparatus 10 is started, the user is waiting for the startup, and, in some cases, it is desired to execute the recovery process earlier and prioritize startup itself, rather than preventing the recovery process from being erroneously executed. In response to such a case, the time limit setting unit 32 may not extend the time limit of the watchdog timer 22 immediately after the information processing apparatus 10 is started.

Specifically, a prescribed time after startup is set in advance, and in a case where the elapsed time since the information processing apparatus 10 is started in step is within the prescribed time after startup, even in a case where the apparatus load of the information processing apparatus 10 exceeds the first load threshold, the time limit setting unit 32 may maintain the time limit of the watchdog timer 22 at the initial setting time without being extended.

Thus, immediately after the information processing apparatus 10 is started, execution of the recovery process earlier has priority over suppression of execution of the erroneous recovery process, and it is possible to quickly execute the recovery process in a case where the information processing apparatus 10 has fallen into an abnormal state immediately after the startup. As described above, in the present exemplary embodiment, the time limit setting unit 32 can increase the time limit of the watchdog timer 22 according to the apparatus load after the information processing apparatus 10 is started, so the initial setting time can be made shorter than before. Thus, it is possible to more quickly execute the recovery process in a case where the information processing apparatus 10 has fallen into an abnormal state immediately after the startup.

Startup of the information processing apparatus 10 includes not only a case where the information processing apparatus 10 is started by the power supply being turned on from a completely off state (hereinafter referred to as "cold boot"), but also a case where the information processing apparatus 10 is started (that is, returned) from the power saving mode.

Here, in a case where the information processing apparatus 10 is cold booted, the amount of processing for startup is larger than in the case of returning from the power saving mode. Therefore, the first prescribed time after startup and the second prescribed time after startup which is shorter than the first prescribed time after startup are set in advance, in a case where the information processing apparatus 10 is cold booted, within the first prescribed time after startup which is shorter than the second prescribed time after startup, even in a case where the apparatus load of the information processing apparatus 10 exceeds the first load threshold, the time limit setting unit 32 maintains the time limit of the watchdog timer 22 at the initial setting time. In a case where the information processing apparatus 10 is started from the power saving mode, within the second prescribed time after startup, even in a case where the apparatus load of the information processing apparatus 10 exceeds the first load threshold, the time limit setting unit 32 may maintains the time limit of the watchdog timer 22 at the initial setting time.

The schematic configuration of the information processing apparatus 10 according to the present exemplary embodiment is as described above. Hereinafter, a specific example of the process of the time limit setting unit 32 will be described with reference to FIG. 2.

Figure 2:
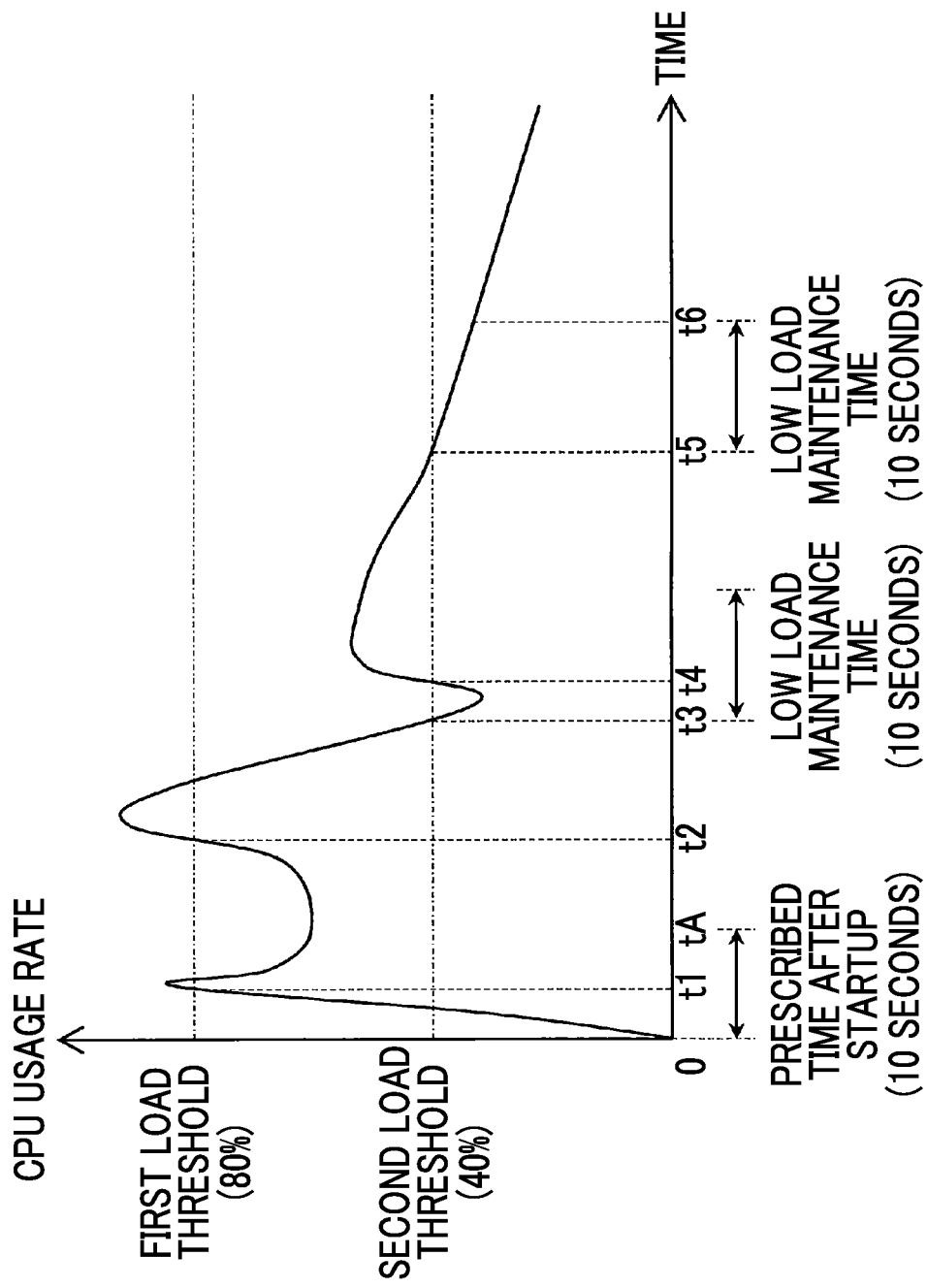
FIG. 2 is a graph showing a change over time of a CPU usage rate.

FIG. 2 is a graph showing a change over time of a CPU usage rate. In the following description, it is assumed that the apparatus load of the information processing apparatus 10 is the CPU usage rate, the first load threshold is 80%, the second load threshold is 40%, the initial setting time is 3 seconds, the extension time is 60 seconds, the prescribed time after startup is 10 seconds, and the low load maintenance time is 10 seconds. The time limit setting unit 32 acquires the CPU usage rate every 1.5 seconds, and determines whether or not to set the watchdog timer 22.

First, in a case where the information processing apparatus 10 is started at time 0, the CPU constituting the processor 24 executes a process for startup, so that the CPU usage rate sharply increases, and the CPU usage rate exceeds 80% of the first load threshold at time t1. Here, since the time t1 is a time within 10 seconds which is a prescribed time after startup from the startup time, even in a case where the CPU usage rate exceeds 80% at time t1, the time limit setting unit 32 does not set the time limit of the watchdog timer 22 to 60 seconds which is the extension time, but maintains the time limit at 3 seconds which is the initial setting time.

In a case where the CPU usage rate again exceeds 80% at time t2, which is a time when the prescribed time after startup has elapsed from the startup time, the time limit setting unit 32 sets the time limit of the watchdog timer 22 to 60 seconds which is the extension time.

Thereafter, the CPU usage rate decreases, and at time t3, the CPU usage rate is less than the second load threshold of 40%. The time limit setting unit 32 does not shorten the time limit of the watchdog timer 22 at time t3, and starts monitoring whether or not the CPU usage rate is maintained at less than 40% for 10 seconds, which is the low load maintenance time, starting from time t3. At time t4 within the low load maintenance time from time t3, the CPU usage rate exceeds 40%. Therefore, the time limit setting unit 32 ends the monitoring whether or not the CPU usage rate is maintained at less than 40% without shortening the time limit of the watchdog timer 22.

Further, thereafter, the CPU usage rate decreases, and at time t5, the CPU usage rate becomes less than 40% again. The time limit setting unit 32 does not shorten the time limit of the watchdog timer 22 at time t5, similarly to time t3, and starts monitoring whether or not the CPU usage rate is maintained at less than 40% for 10 seconds, which is the low load maintenance time, starting from time t5.

Since the CPU usage rate is maintained at 40% or less for 10 seconds from time t5, the time limit setting unit 32 shortens the time limit of the watchdog timer 22, after the low load maintenance time has elapsed from time t5, that is, at time t6 that is 10 seconds has elapsed after time t5. For example, the time limit is shortened by 10 seconds to 50 seconds. Further, in the time after time t6, the time limit setting unit 32 monitors the CPU usage rate every 1.5 seconds, and as long as the CPU usage rate is equal to or less than 40%, the time limit setting unit 32 (for example, every 10 seconds) reduces the time limit of the watchdog timer 22 every 1.5 seconds in a stepwise manner toward 3 seconds which is the initial setting time.

Figure 3:
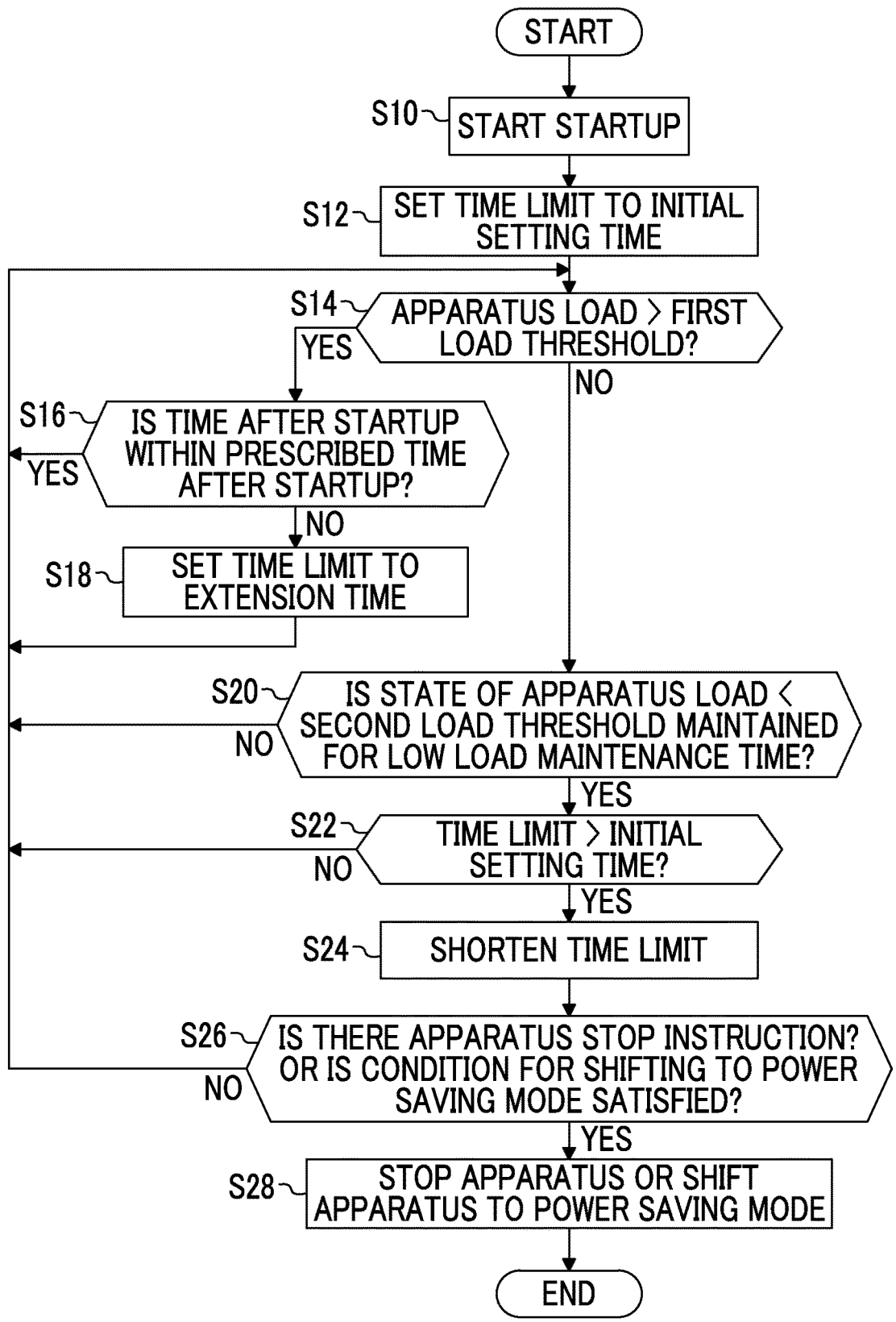
FIG. 3 is a flowchart showing a processing flow of the information processing apparatus in the present exemplary embodiment.

Hereinafter, the processing flow of the information processing apparatus 10 according to the present exemplary embodiment will be described with reference to the flowchart illustrated in FIG. 3.

In step S10, startup of the information processing apparatus 10 starts.

In step S12, the time limit setting unit 32 sets the setting time of the watchdog timer 22 to an initial setting time (for example, 3 seconds).

In step S14, the time limit setting unit 32 determines whether the apparatus load of the information processing apparatus 10 exceeds the first load threshold (for example, whether the CPU usage rate exceeds 80%). In a case where the apparatus load exceeds the first load threshold, the process proceeds to step S16.

In step S16, the time limit setting unit 32 determines whether or not the elapsed time since the information processing apparatus 10 is started in step S10 is within a predetermined prescribed time after startup (for example, within 10 seconds). In a case where the elapsed time is within the prescribed time after startup, the process returns to step S14. In a case where the prescribed time after startup has already passed, the process proceeds to step S18.

In step S18, the time limit setting unit 32 sets the time limit of the watchdog timer 22 to an extension time (for example, 60 seconds). Thereafter, the process returns to step S14.

In a case where the apparatus load of the information processing apparatus 10 is equal to or less than the first load threshold in step S14, the process proceeds to step S20.

In step S20, the time limit setting unit 32 determines whether or not a state where the apparatus load of the information processing apparatus 10 is less than the second load threshold (for example, the CPU usage rate is less than 40%) is maintained for a low load maintenance time (for example, seconds). In a case where the apparatus load of the information processing apparatus 10 is not less than the second load threshold, or in a case where the apparatus load has temporarily become less than the second load threshold but the state in which the apparatus load is less than the second load threshold is not maintained for the low load maintenance time, the process returns to step S14. In a case where the state in which the apparatus load of the information processing apparatus 10 has become less than the second load threshold is maintained for the low load maintenance time, the process proceeds to step S22.

In step S22, it is determined whether or not the current time limit of the watchdog timer 22 is longer than the initial setting time. In a case where the time limit is not longer than the initial setting time, that is, in a case where the time limit is the initial setting time, the process returns to step S14. In a case where the time limit is longer than the initial setting time, the process proceeds to step S24.

In step S24, the time limit setting unit 32 shortens the time limit of the watchdog timer 22. Here, the time limit setting unit 32 gradually shortens the time limit instead of immediately shortening the time limit to the initial setting time (3 seconds). For example, the time limit setting unit 32 shortens the current time limit by 10 seconds.

In step S26, the processor 24 determines whether or not there is an apparatus stop instruction from the user to the information processing apparatus 10, or whether or not the information processing apparatus 10 satisfies a condition for shifting to a predetermined power saving mode (for example, whether or not the information processing apparatus 10 has not been operated for a predetermined time). In a case where there is no apparatus stop instruction and the condition for shifting to the power saving mode is not satisfied, the process returns to step S14. In a case where there is an apparatus stop instruction or the condition for shifting to the power saving mode is satisfied, the process proceeds to step S28.

In a case where an apparatus stop instruction is input in step S26, the processor 24 stops the information processing apparatus 10 in step S28. In a case where the condition for shifting to the power saving mode is satisfied in step S26, the processor 24 shifts the information processing apparatus 10 to the power saving mode in step S28.

Before the information processing apparatus 10 stops or shifts to the power saving mode, the processing of steps S14 to S26 is repeated. The determination process in step S14 is executed at predetermined time intervals, for example, every 1.5 seconds.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
execute a reset process for resetting a watchdog timer,
execute a recovery process of the information processing apparatus, in a case where the watchdog timer is not able to be reset within a time limit, and
set the time limit to a longer time, in a case where an apparatus load which is at least one of a current processing load per unit time of the information processing apparatus or a processing amount of a processing request which is input to the information processing apparatus is large, as compared to a case where the apparatus load is small,
wherein the processor acquires the apparatus load intermittently, and in a case where the apparatus load exceeds a first load threshold, the processor sets the time limit to an extension time longer than an initial setting time,
wherein the processor sets the time limit to a time shorter than the extension time, in a case where the apparatus load is less than a second load threshold smaller than the first load threshold.

2. The information processing apparatus according to claim 1,
wherein the processor sets the time limit to a time shorter than the extension time, in a case where a state in which the apparatus load is less than the second load threshold is maintained for a predetermined time.

3. An information processing apparatus comprising:
a processor configured to
execute a reset process for resetting a watchdog timer, execute a recovery process of the information processing apparatus, in a case where the watchdog timer is not able to be reset within a time limit, and set the time limit to a longer time, in a case where an apparatus load which is at least one of a current processing load per unit time of the information processing apparatus or a processing amount of a processing request which is input to the information processing apparatus is large, as compared to a case where the apparatus load is small, wherein the processor acquires the apparatus load intermittently, and in a case where the apparatus load exceeds a first load threshold, the processor sets the time limit to an extension time longer than an initial setting time, wherein the time limit is at least longer than the initial setting time, and the processor shortens the time limit toward the initial setting time in a stepwise manner, in a case where all of a plurality of the successively acquired apparatus loads are equal to or less than a second load threshold.

4. The information processing apparatus according to claim 1, wherein the time limit is at least longer than the initial setting time, and the processor shortens the time limit toward the initial setting time in a stepwise manner, in a case where all of a plurality of the successively acquired apparatus loads are less than the second load threshold.

5. The information processing apparatus according to claim 2, wherein the time limit is at least longer than the initial setting time, and the processor shortens the time limit toward the initial setting time in a stepwise manner, in a case where all of a plurality of the successively acquired apparatus loads are less than the second load threshold.

6. An information processing apparatus comprising:

a processor configured to execute a reset process for resetting a watchdog timer, execute a recovery process of the information processing apparatus, in a case where the watchdog timer is not able to be reset within a time limit, and set the time limit to a longer time, in a case where an apparatus load which is at least one of a current processing load per unit time of the information processing apparatus or a processing amount of a processing request which is input to the information processing apparatus is large, as compared to a case where the apparatus load is small, wherein the processor acquires the apparatus load intermittently, and in a case where the apparatus load exceeds a first load threshold, the processor sets the time limit to an extension time longer than an initial setting time, wherein the processor maintains the time limit to the initial setting time within a prescribed time since the information processing apparatus is started, even in a case where the apparatus load exceeds the first load threshold, wherein the prescribed time in a case where the information processing apparatus is started by turning on the power is longer than the prescribed time in a case where the information processing apparatus is started from a power saving mode.

* * * * *